(12) United States Patent
Takamaru et al.

(10) Patent No.: US 7,935,305 B2
(45) Date of Patent: May 3, 2011

(54) HYDROGEN STORAGE ALLOY, PRODUCTION METHOD THEREFOR AND NICKEL-HYDROGEN SECONDARY BATTERY-USE CATHODE

(75) Inventors: Kiyofumi Takamaru, Kobe (JP); Hideaki Ikeda, Kakogawa (JP); Koji Tatsumi, Chigasaki (JP)

(73) Assignee: Santoku Corporation, Kobe-Shi (JP)

( * ) Notice: Subject to any disclaimer, the term of this patent is extended or adjusted under 35 U.S.C. 154(b) by 0 days.

(21) Appl. No.: 12/794,224

(22) Filed: Jun. 4, 2010

(65) Prior Publication Data

US 2010/0301283 A1 Dec. 2, 2010

Related U.S. Application Data

(60) Continuation of application No. 11/838,065, filed on Aug. 13, 2007, now abandoned, which is a division of application No. 10/473,292, filed as application No. PCT/JP02/03163 on Mar. 29, 2002, now abandoned.

(30) Foreign Application Priority Data

Apr. 3, 2001 (JP) .................................. 2001-104652

(51) Int. Cl.
  *C22C 19/03* (2006.01)
  *H01B 1/02* (2006.01)
(52) U.S. Cl. ..................... 420/455; 420/900; 252/519.15
(58) Field of Classification Search .................. 420/900, 420/455; 252/519.15
  See application file for complete search history.

(56) References Cited

U.S. PATENT DOCUMENTS 5,654,115 A 8/1997 Hasebe et al.

FOREIGN PATENT DOCUMENTS

| EP | 0765947 | 4/1997 |
|---|---|---|
| JP | 657358 | 3/1994 |
| JP | 06073466 | 3/1994 |
| JP | 10106621 | 4/1998 |
| JP | 11097002 | 4/1999 |
| JP | 2000-021399 | 1/2000 |
| JP | 2000144278 | 5/2000 |
| JP | 2000192117 | 7/2000 |
| JP | 2000-234134 | 8/2000 |

OTHER PUBLICATIONS

T. Sakai et al., "Rechargeable hydrogen batteries using rare-earth-based hydrogen storage alloys", Journal of Alloys and Compounds, Elsevier Sequoia, Lausanne, CH, vol. 180, No. 1, Mar. 25, 1992, pp. 37-54.

T. Sakai et al., "Rare-earth-based alloy electrodes for a nickel-metal hydride battery", Journal of the Less-Common Metals, Elsevier-Sequoia S.A. Lausanne, Ch, vol. 172-174, No. 10, Sep. 1, 1991, pp. 1175-1184.

*Primary Examiner* — Roy King
*Assistant Examiner* — Jessee R. Roe
(74) *Attorney, Agent, or Firm* — Fish & Richardson P.C.

(57) ABSTRACT

The present invention relates to hydrogen storage alloys, methods for producing the same, and anodes produced with such alloys for nickel-hydrogen rechargeable batteries. The alloys are useful as electrode materials for nickel-hydrogen rechargeable batteries, excellent, when used as anode materials, in corrosion resistance or activity such as initial activity and high rate discharge performance, of low cost compared to the conventional alloys with a higher Co content, and recyclable. The alloys are of a composition represented by the formula (1), and has a substantially single phase structure, and the crystals thereof have an average long axis diameter of 30 to 160 µm, or not smaller than 5 µm and smaller than 30 µm. The present anodes for rechargeable batteries contain at least one of these hydrogen storage alloys:

$$RNi_xCo_yM_z \quad (1)$$

(R: rare earth elements etc., M: Mg, Al, etc., $3.7 \leqq x \leqq 5.3$, $0.1 \leqq y \leqq 5.0$, $0.1 \leqq z \leqq 1.0$, $5.1 \leqq x+y+z \leqq 5.5$).

5 Claims, No Drawings

HYDROGEN STORAGE ALLOY, PRODUCTION METHOD THEREFOR AND NICKEL-HYDROGEN SECONDARY BATTERY-USE CATHODE

RELATED APPLICATION

This application is a continuation of U.S. Application Ser. No. 11/838,065 filed Aug. 13, 2007, now abandoned which is a divisional of U.S. application Ser. No. 10/473,292 filed Mar. 5, 2004, now abandoned, which is the National stage of application PCT/JP02/03163 filed Mar. 29, 2002, which claims the benefit of Japanese Patent Application No. 2001-104652, filed Apr. 3, 2001.

FIELD OF ART

The present invention relates to hydrogen storage alloys, methods for producing the same, and anodes for nickel-hydrogen rechargeable batteries, which alloys are useful as electrode materials for nickel-hydrogen rechargeable batteries, and when used as the electrode materials, exhibit particularly excellent cycle life characteristics.

BACKGROUND ART

Metal oxide-hydrogen batteries with a hydrogen anode made of a hydrogen storage alloy have recently been attracting attention for their inherently high energy density, advantageous volume efficiency, safe operability, and excellence in both performance and reliability. In this type of batteries, $AB_5$ type hydrogen storage alloys are mainly used as the anode material. For improved battery performance, the alloys are demanded to have various properties, such as hydrogen storage capacity, equilibrium pressure, corrosion resistance, and flatness of the plateau. Some of these properties are conflicting with each other, so that studies have been made for improving one property without sacrificing the other, some with practical success.

For improving the corrosion resistance of hydrogen storage alloys, which will contribute to improved battery cycle life, addition of cobalt (Co) to the alloys has been observed to give certain effects and put into practice. However, since Co is very expensive, the addition thereof disadvantageously increases the alloy cost. Thus studies have been made to retain the corrosion resistance of an alloy even at a reduced Co content. Various solutions have been attempted for this purpose, such as using other additional elements with Co, increasing the ratio of the B-site components mainly consisting of Ni to the A-site components mainly consisting of rare earth elements, and the combination of these.

In the above methods, retention of the corrosion resistance at a reduced Co content is achieved. However, another problem arises in the method of using other additional elements, that the increased number of compositional elements of the alloy makes recycling of the used batteries difficult, which increases the costs for recycling. In the method of increasing the ratio of the B-site components, homogenization of the alloy structure is difficult, which causes sharpening of the plateau slope or formation of two plateaus, leading to decrease in the capacity and internal pressure characteristics of the batteries.

Thus development of hydrogen storage alloys is demanded in which the above problems have been overcome, and which are easy to recycle, low in cost, and excellent in corrosion resistance.

On the other hand, for improving the activity of hydrogen storage alloys with expectation of improvement in battery activity, attempts have been made to treat the alloy surface with acid or alkali, or to increase the ratio of the A-site components. However, the activity conflicts with the corrosion resistance, and thus these methods for improving the activity simultaneously impair the corrosion resistance.

In the art of metal hydride-hydrogen batteries, electrode active materials that satisfy both of these conflicting properties have been under development, and as the materials for the active materials, a mixture of an alloy excellent in corrosion resistance and an alloy excellent in activity, has been proposed for use. However, the alloys excellent in different properties used in this method are also different in their compositions or structures, or obtained by totally different production methods. Thus, even though the activity and the corrosion resistance are improved, the capacity and the internal pressure characteristics of the batteries are reduced, or the costs for recycling the batteries after use are increased.

SUMMARY OF THE INVENTION

It is therefor an object of the present invention to provide hydrogen storage alloys, methods for producing the same, and anodes produced with such alloys for nickel-hydrogen rechargeable batteries, which alloys are useful as electrode materials for nickel-hydrogen rechargeable batteries, which are excellent, when used as anode materials, in both corrosion resistance and activity such as initial activity and high rate discharge performance, which are of low cost compared to the conventional alloys with a higher Co content, and which are recyclable.

It is another object of the present invention to provide anodes for nickel-hydrogen rechargeable batteries in which the activity such as initial activity and high rate discharge performance is well balanced with the conflicting corrosion resistance, simply by using two or more kinds of particular hydrogen storage alloys of different crystal grain sizes.

In order to achieve these objects, the inventors of the present invention have made intensive studies in the relationship between the composition and structure of alloys and the corrosion resistance. As a result of the studies, the inventors have found out that the above objects may be achieved by limiting the B-site components within a particular range, giving the alloy a single phase structure, and making the grain sizes of the crystals constituting the alloy structure fall within a particular range, as well as by producing anodes using two or more kinds of hydrogen storage alloys of different crystal grain sizes. The present inventors have also made studies for methods for producing alloys that achieve the above objects, to complete methods for industrially producing such alloys.

According to the present invention, there is provided a hydrogen storage alloy of a composition represented by the formula (1), wherein said alloy has a substantially single phase structure, and crystals of said alloy have an average long axis diameter of 30 to 160 µm:

$$RNi_xCo_yM_z \quad (1)$$

wherein R stands for one or a mixture of rare earth elements including yttrium, M stands for Mg, Al, Mn, Fe, Cu, Zr, Ti, Mo, W, B, or mixtures thereof, x satisfies $3.7 \leq x \leq 5.3$, y satisfies $0.1 \leq y \leq 0.5$, z satisfies $0.1 \leq y \leq 1.0$, and $5.1 \leq x+y+z \leq 5.5$ (referred to as alloy (a) hereinbelow).

According to the present invention, there is also provided a hydrogen storage alloy of a composition represented by the formula (1), wherein said alloy has a substantially single phase structure, and crystals of said alloy have an average long axis diameter of not smaller than 5 μm and smaller than 30 μm (referred to as alloy (b) hereinbelow).

According to the present invention, there is also provided a method for producing alloy (a) comprising the steps of:

(A) melting materials for an alloy of a composition represented by the formula (1) to prepare an alloy melt;

(B-1) cooling and solidifying said alloy melt into alloy flakes having an average thickness of 0.1 to 0.5 mm; and (C-1) heat-treating said alloy flakes at 950 to 1100° C. for 30 minutes to 10 hours.

According to the present invention, there is further provided a method for producing alloy (b) comprising the steps of:

(A) melting materials for an alloy of a composition represented by the formula (1) to prepare an alloy melt;

(B-2) cooling and solidifying said alloy melt into alloy flakes having an average thickness of 0.05 to 0.2 mm; and (C-2) heat-treating said alloy flakes at 900 to 1000° C. for 1 to 10 hours.

According to the present invention, there is also provided an anode for a nickel-hydrogen rechargeable battery comprising alloy (a) and an electrically conductive material as anode materials.

According to the present invention, there is further provided an anode for a nickel-hydrogen rechargeable battery comprising alloy (a), alloy (b), and an electrically conductive material as anode materials.

PREFERRED EMBODIMENTS OF THE INVENTION

The present invention will now be explained in detail.

The alloys (a) and (b) of the present invention both have the composition represented by the formula (1). In the formula (1), R stands for one or a mixture of two or more of rare earth elements including yttrium. R may preferably be one or more elements selected from the group consisting mainly of La, Ce, Pr, and Nd for achieving improved corrosion resistance, when, for example, the alloy is used as an anode active material for a nickel-hydrogen rechargeable battery. It is preferred to increase the La content in the composition of R for preparing an active material of high capacity. The La content is preferably not lower than 50%, more preferably not lower than 55%, most preferably not lower than 65%, by atomic percent. Accordingly, when R is one or more elements selected from the group consisting mainly of La, Ce, Pr, and Nd, it is preferred to suitably select the composition of R from 50 to 100 at % La, 0 to 50 at % Ce, 0 to 50 at % Pr, and 0 to 50 at % of Nd.

In the formula (1), x and y denote the atomic ratios of Ni and Co, respectively. x representing the Ni content satisfies $3.7 \leq x \leq 5.3$. As to y, the Co content is preferably as low as possible as long as the desired corrosion resistance is achieved, since one of the objects of the present invention is to reduce the alloy cost by reducing the Co content. With the Co content y of over 0.5, the corrosion resistance is improved, while the alloy cost is increased. With the Co content y of less than 0.1, the corrosion resistance is inevitably lowered. Thus y is $0.1 \leq y \leq 0.5$, preferably $0.2 \leq y \leq 0.45$.

In the formula (1), M represents additional elements for adjusting the hydrogen storage performance of the alloy, and stands for one or more elements selected from the group consisting of Mg, Al, Mn, Fe, Cu, Zr, Ti, Mo, W, and B. When the alloy contains too large a number of additional elements, the inconveniences in recycling the alloy outstrip the contribution of the additional elements to the alloy characteristics. Thus the number of additional elements is preferably 2 to 5, more preferably 2 to 3. The content of M is denoted by z. With z of less than 0.1, the effect of the addition of the elements M on the alloy characteristics is too little, whereas even with z of over 1.0, no further increase in the effect is achieved, so that z is $0.1 \leq z \leq 1.0$, preferably $0.35 \leq z \leq 1.0$.

In the alloy of the present invention, the value of x+y+z representing the ratio of the B-site elements is important. This value is one of the factors for improving the corrosion resistance of the alloy. If this value is less than 5.1, the corrosion resistance cannot be improved, whereas if more than 5.5, it is quite difficult to give the alloy a single phase structure, and the corrosion resistance is lowered. Thus x+y+z is $5.1 \leq x+y+z \leq 5.5$, preferably $5.2 \leq x+y+z \leq 5.4$.

The structure of the present alloy is of a substantially single phase for achieving the desired corrosion resistance. Whether an alloy is of a single phase structure or not may be confirmed by X-ray diffraction or under an electron microscope. Having a substantially single phase structure herein means that the presence of other phases cannot be observed clearly by these methods.

In the alloy (a) of the present invention, the average long axis diameter of the crystal grains is 30 to 160 μm, preferably 30 to 120 μm, more preferably 70 to 100 μm, and it is particularly preferred that the crystal grains are of a uniform size, for further improving the corrosion resistance. With the average long axis diameter of less than 30 μm, the desired corrosion resistance is hard to be achieved, whereas with the average long axis diameter of over 160 μm, the activity required as an anode active material for a rechargeable battery cannot be obtained.

In the alloy (b) of the present invention, the average long axis diameter of the crystal grains is not smaller than 5 μm and smaller than 30 μm, preferably not smaller than 10 μm and smaller than 30 μm, more preferably 10-20 μm, and it is particularly preferred that the crystal grains are of a uniform size for improving the activity when used in combination with the alloy (a) as anode active materials for a rechargeable battery. With the average long axis diameter of smaller than 5 μm, the desired corrosion resistance is hard to be achieved, whereas with the average long axis diameter of not smaller than 30 μm, the activity as an anode active material for a rechargeable battery is hard to be improved in combination with the alloy (a).

The alloys of the present invention, when used for example as electrode materials, may be subjected to surface coating by plating or with a high polymer, surface treatment with an acid or alkali solution, or any conventional treatment, for the purpose of further improving various properties before the alloys are processed into electrodes.

The alloys of the present invention may be produced, for example, by the methods of the present invention including the steps of: (A) melting the materials for an alloy of the composition represented by the formula (1) to prepare an alloy melt; (B-1) or (B-2) cooling and solidifying the alloy melt into alloy flakes having the particular average thickness; and (C-1) or (C-2) heat-treating the alloy flakes under the particular conditions. The melting step (A) may be performed in a conventional manner.

According to the methods of the present invention, the average long axis diameter of the crystals of the resulting alloys may be regulated by controlling the cooling rate in preparing the alloy flakes, the thickness of the alloy flakes, and the like factors. In general, the higher the cooling rate is, the smaller the long axis diameter of the crystal grains is, and vice versa. In the methods of the present invention, since the alloys in the form of as-cast flakes do not have a single phase structure, the alloy flakes are subsequently heat-treated under the particular conditions for giving a single phase structure thereto. If the cooling rate in the production of the alloy flakes is too low, a secondary phase of crystals appear, which grow so coarse that the alloy flakes cannot be made into a single phase structure in the subsequent heat treatment, thus not being preferred. On the other hand, if the cooling rate is too high, the crystals are made fine and readily made into a single phase structure, but the thickness of the alloy flakes is hard to be controlled within the particular range, and the productivity is lowered, thus not being preferred.

In view of the above, the cooling rate in producing the alloy flakes in the methods of the present invention is usually in the range of 10 to 3000° C. per second, preferably 100 to 1000° C. per second. The cooling rate may suitably be selected from the above range so that the alloy flakes have the particular thickness, taking the alloy composition and thickness of the alloy flakes into consideration.

In the method for producing alloy (a) of the present invention, if the alloy flakes are too thick, the radial temperature variation in the alloy flakes is great, which results in difficulty in generating crystals of a uniform size. Too thick alloy flakes also provide enlarged reaction areas, which cause too much growth of the crystals in the subsequent long-time heat treatment. Thus, in step (B-1), the thickness of the alloy flakes should be adjusted to 0.1 to 0.5 mm, preferably 0.2 to 0.3 mm. Such alloy flakes may preferably be produced by single- or twin-roll strip casting, centrifugal casting, or rotary disk casting.

On the other hand, in the method for producing alloy (b) of the present invention, since the average long axis diameter of the crystals of the alloy (b) is smaller than that of the alloy (a), the thickness of the alloy flakes should be adjusted to 0.05 to 0.2 mm in step (B-2).

In step (C-1) of the method for producing the alloy (a), the heat treatment for giving the alloy flakes a single phase structure is performed at 950 to 1100° C. for 30 minutes to 10 hours. At lower than 950° C., it takes too much time for the crystals to grow to the predetermined crystal grain size, resulting in dispersion in the crystal grain size. At higher than 1100° C., a secondary phase is reprecipitated, and the alloy of a single phase structure cannot be obtained.

In step (C-2) of the method for producing the alloy (b), the heat treatment for giving the alloy flakes a single phase structure is performed at 900 to 1000° C. for 1 to 10 hours. At lower than 900° C., the single phase structure is hard to be given to the alloy flakes, and it takes time for the crystals to grow to the predetermined crystal grain size. At higher than 1000° C., the crystals may grow beyond the predetermined grain size, or dispersion may occur in the crystal grain sizes.

The anode for a nickel-hydrogen rechargeable battery of the present invention contains the alloy (a), alloy (b), or a mixture of alloys (a) and (b), and an electrically conductive material, as anode materials. The alloy (a), alloy (b), or a mixture of alloys (a) and (b) acts as an anode active material in the rechargeable battery. The anode of the present invention may optionally contain other conventionally-used components, as long as the objects of the present invention is achieved, and may contain, in particular, other active materials.

The anode for a nickel-hydrogen rechargeable battery of the present invention may be produced using alloy (a) and/or alloy (b) as the essential components of the active material, which are mixed with a binder, an electrical conductivity assisting agent, and the like in a conventional manner, and molded into an anode. There is no particular limitation imposed on the binder and the electrical conductivity assisting agent, and those used conventionally may be used here.

When the alloy (a) alone is used as the active material, the resulting anode exhibits excellent corrosion resistance, whereas when the alloy (b) alone is used as the active material, the resulting anode exhibits excellent initial activity and load characteristics. When the two, alloys are used in combination, the resulting anode is given the properties of the both. For preparing an anode for a battery for general use having initial activity and corrosion resistance both improved, the mixing ratio of the alloy (a) to the alloy (b) is preferably within a range of 99:1 to 90:10 by weight. If the mixing ratio of the alloy (b) to the alloy (a) is too low, the initial activity cannot be improved sufficiently, whereas if the mixing ratio of the alloy (b) is too high, the corrosion resistance cannot be improved sufficiently, thus not being preferred. For preparing an anode for a high-output power battery having high rate discharge performance and corrosion resistance both improved, the mixing ratio of the alloy (a) to the alloy (b) is preferably within a range of 90:10 to 50:50. If the mixing ratio of the alloy (a) to the alloy (b) is too low, the corrosion resistance cannot be improved sufficiently, whereas if the mixing ratio of the alloy (a) is too high, the high rate discharge performance cannot be improved sufficiently, thus not being preferred.

With the particular composition, substantially single phase structure, and controlled average long axis diameter of the crystals, the hydrogen storage alloys of the present invention are useful as electrode materials for nickel-hydrogen rechargeable batteries. When used as anode materials, the present alloys exhibit excellent activities, such as initial activity and high rate discharge performance, and excellent corrosion resistance. The present alloys are also low in cost compared to the conventional alloys with a higher Co content, and are recyclable. By the methods of the present invention, such hydrogen storage alloys are easily produced in an industrial scale.

Since the anodes for nickel-hydrogen rechargeable batteries of the present invention contain the hydrogen storage alloys of the present invention as the active materials, the advantages of the present alloys when used for anodes for rechargeable batteries mentioned above, are achieved. Further, nickel-hydrogen rechargeable batteries in which the activity, in particular, the initial activity and the high rate discharge performance, is well balanced with the conflicting corrosion resistance, may be provided simply by employing two or more kinds of particular hydrogen storage alloys having different crystal grain sizes.

EXAMPLES

The present invention will now be explained in more detail with reference to Examples and Comparative Examples, but the present invention is not limited thereto.

Examples 1-19 and Comparative Examples 1-3

Misch metal (abbreviated as Mm hereinbelow) manufactured by Santoku Corporation (rare earth composition: 70 at % La, 22 at % Ce, 2 at % Pr, and 6 at % Nd), Ni, Co, Mn, and Al were mixed at the elemental ratio of 4.00:0.40:0.65:0.20, and subjected to high frequency induction melting in an alumina crucible in an argon gas atmosphere to prepare an alloy melt. The alloy melt was rapidly cooled by single-roll strip casting to prepare alloy flakes of a hydrogen storage alloy having the average thickness shown in Table 1. The obtained alloy flakes were heat-treated in an argon gas atmosphere under the conditions shown in Table 1.

The resulting heat-treated hydrogen storage alloy was subjected to observation of its alloy structure under a scanning electron microscope, and X-ray diffraction to see whether the alloy was substantially of a single phase structure. Further, from the alloy structure observed under a scanning electron microscope, the average long axis diameter of the crystal grains along the longitudinal axis of the alloy flakes was determined. The results are shown in Table 1.

Next, the heat-treated alloy was mechanically pulverized to prepare hydrogen storage alloy powders having the average particle size of not larger than 60 μm. 1.2 g of the alloy powders were mixed with 1 g of carbonyl nickel as an electrically conductive material and 0.2 g of fluororesin powders as a binder, and formed into fibers. The resulting fibers were wrapped with nickel mesh, and pressure molded under the pressure of 2.8 ton/cm$^2$ to thereby prepare an anode for a nickel-hydrogen rechargeable battery. The obtained anode was placed in 30% KOH, and subjected to a charge-discharge text in a pressure vessel under 5 atm for evaluation of the initial activity, high rate discharge performance, and corrosion resistance.

The charge-discharge test was run for 10 cycles at the discharge current of 0.2 C, and the ratio of the discharge capacity on the 3rd cycle to the discharge capacity on the 10th cycle was taken as the initial activity. The test was further run, and the capacity upon discharge at 1 C on the 11th cycle was measured, and the ratio of this value to the discharge capacity on the 10th cycle was taken as the high rate discharge performance. The test was further run at the discharge current of 0.2 C from the 12th cycle on, and the ratio of the capacity maintained on the 600th cycle to the discharge capacity at the 10th cycle was taken as the corrosion resistance. The results are shown in Table 1.

TABLE 1

|  | Temperature for Heat Treatment (° C.) | Duration of Heat Treatment (hrs) | Average Thickness of Cast Pieces (mm) | Single Phase/ Secondary Phase | Average Long Axis Diameter of Main Phase (μm) | Initial Activity (%) | High Rate Discharge Perfomsnce (%) | Corrosion Resistance (%) |
|---|---|---|---|---|---|---|---|---|
| Example 1 | 950 | 0.5 | 0.230 | Single phase | 33 | 95.9 | 89.7 | 91.1 |
| Example 2 | 950 | 1 | 0.250 | Single phase | 62 | 94.3 | 86.9 | 94.8 |
| Example 3 | 950 | 6 | 0.225 | Single phase | 73 | 93.9 | 88.2 | 95.4 |
| Example 4 | 950 | 10 | 0.396 | Single phase | 95 | 93.6 | 85.6 | 96.7 |
| Example 5 | 1000 | 0.5 | 0.270 | Single phase | 52 | 95.6 | 87.0 | 95.7 |
| Example 6 | 1000 | 1 | 0.220 | Single phase | 72 | 94.0 | 85.8 | 95.8 |
| Example 7 | 1000 | 6 | 0.347 | Single phase | 87 | 93.6 | 85.9 | 96.5 |
| Example 8 | 1000 | 10 | 0.356 | Single phase | 89 | 94.5 | 85.4 | 96.0 |
| Example 9 | 1050 | 0.5 | 0.357 | Single phase | 106 | 93.4 | 85.7 | 96.1 |
| Example 10 | 1050 | 1 | 0.192 | Single phase | 74 | 94.2 | 86.0 | 96.6 |
| Example 11 | 1050 | 6 | 0.203 | Single phase | 76 | 93.5 | 86.3 | 96.3 |
| Example 12 | 1050 | 10 | 0.392 | Single phase | 138 | 92.8 | 84.8 | 94.1 |
| Example 13 | 1100 | 0.5 | 0.180 | Single phase | 53 | 95.1 | 88.7 | 93.0 |
| Example 14 | 1100 | 1 | 0.272 | Single phase | 82 | 93.8 | 86.4 | 95.7 |
| Example 15 | 1100 | 6 | 0.400 | Single phase | 118 | 93.5 | 85.5 | 95.7 |
| Example 16 | 1100 | 10 | 0.467 | Single phase | 152 | 92.3 | 84.3 | 92.0 |
| Example 17 | 900 | 10 | 0.163 | Single phase | 13 | 98.3 | 93.7 | 83.6 |
| Example 18 | 950 | 6 | 0.181 | Single phase | 17 | 97.4 | 91.3 | 85.1 |
| Example 19 | 1000 | 1 | 0.066 | Single phase | 15 | 97.7 | 92.2 | 84.6 |
| Comp. Ex. 1 | 850 | 10 | 0.146 | Secondary phase appeared | 7.8 | 97.6 | 89.3 | 78.9 |
| Comp. Ex. 2 | 1200 | 5 | 0.289 | Secondary phase appeared | 147 | 92.4 | 83.2 | 80.2 |
| Comp. Ex. 3 | 1000 | 10 | 0.593 | Single phase | 179 | 91.8 | 82.9 | 83.5 |

Examples 20-24 and Comparative Examples 4 and 5

Hydrogen storage alloys were prepared in the same manner and under the same conditions as in Example 7, and subjected to each evaluation, except that the alloy compositions were as shown in Table 2. The results are shown in Table 2.

TABLE 2

|  | Ni | Co | Al | Mn | $AB_x$ | La/ TRE | Ce/ TRE | Pr/ TRE | Nd/ TRE | Single Phase/ Secondary Phase | Corrosion Resistance (%) |
|---|---|---|---|---|---|---|---|---|---|---|---|
| Example 20 | 3.93 | 0.50 | 0.30 | 0.37 | 5.10 | 50 | 25 | 5 | 20 | Single phase | 95.2 |
| Example 21 | 4.15 | 0.20 | 0.40 | 0.45 | 5.20 | 60 | 40 | 0 | 0 | Single phase | 96.0 |
| Example 22 | 4.15 | 0.40 | 0.30 | 0.45 | 5.30 | 72 | 21 | 2 | 6 | Single phase | 96.8 |
| Example 23 | 4.10 | 0.30 | 0.43 | 0.57 | 5.40 | 83 | 12 | 1 | 4 | Single phase | 95.9 |
| Example 24 | 4.35 | 0.10 | 0.40 | 0.65 | 5.50 | 100 | 0 | 0 | 0 | Single phase | 95.1 |
| Comp. Ex. 4 | 3.75 | 0.40 | 0.25 | 0.60 | 5.00 | 60 | 23 | 3 | 14 | Single phase | 89.3 |
| Comp. Ex. 5 | 4.35 | 0.30 | 0.50 | 0.45 | 5.60 | 82 | 10 | 2 | 6 | Secondary phase appeared | 86.8 |

Examples 25-32 and Comparative Examples 6-7

The hydrogen storage alloy prepared in Example 7 (referred to as alloy (a-1) hereinbelow) and the hydrogen storage alloy prepared in Example 18 (referred to as alloy (b-1) hereinbelow) were mixed at the mixing ratio shown in Table 3, and an anode for a nickel-hydrogen rechargeable battery was produced in the same manner as in Examples 1-19. The resulting anode was subjected to each evaluation in the same manner as in Examples 1-19. The results are shown in Table 3.

Comparative Example 8

A highly active alloy (c) having an equilibrium pressure 0.3 Mpa higher than that of alloy (a-1), was prepared through the melting, casting, and heat-treating steps in the same manner as in Example 7, except that the elemental ratio of the alloy was Mm:Ni:Co:Al:Mn=1:3.55:0.80:0.25:0.37 (Rare earth (Mm) composition: 41 wt % La, 43 wt % Ce, 4 wt % Pr, and 12 wt % Nd). The alloy (a-1) and alloy (c) were mixed at the mixing ratio of 50:50, and an anode for a nickel-hydrogen rechargeable battery was produced in the same manner as in Examples 1-19. The resulting anode was subjected to each evaluation in the same manner as in Examples 1-19. The results are shown in Table 3.

TABLE 3

| | Alloy (a-1) | Alloy (b-1) | Alloy (c) | Initial Activity (%) | High Rate Discharge Performance (%) | Corrosion Resistance (%) |
|---|---|---|---|---|---|---|
| Example 25 | 99 | 1 | 0 | 95.8 | 90.2 | 96.3 |
| Example 26 | 95 | 5 | 0 | 96.4 | 90.8 | 96.2 |
| Example 27 | 90 | 10 | 0 | 97.1 | 91.2 | 96.0 |
| Example 28 | 80 | 20 | 0 | 97.6 | 91.7 | 94.7 |
| Example 29 | 70 | 30 | 0 | 98.0 | 92.0 | 94.0 |
| Example 30 | 50 | 50 | 0 | 98.1 | 92.6 | 92.6 |
| Example 31 | 40 | 60 | 0 | 98.1 | 92.9 | 91.3 |
| Example 32 | 20 | 80 | 0 | 98.2 | 93.2 | 89.8 |
| Comp. Ex. 6 | 100 | 0 | 0 | 93.6 | 85.9 | 96.5 |
| Comp. Ex. 7 | 0 | 100 | 0 | 98.3 | 93.7 | 83.6 |
| Comp. Ex. 8 | 50 | 0 | 50 | 92.3 | 90.8 | 86.2 |

What is claimed is:

1. An anode for a nickel-hydrogen rechargeable battery comprising, as anode materials:

a hydrogen storage alloy (a) of a composition represented by the formula (1), wherein said alloy has a substantially single phase structure, and crystals of said alloy has an average long axis diameter of 70 to 160 μm:

$$RNi_xCo_yM_z \qquad (1)$$

wherein R stands for one or a mixture of rare earth elements including yttrium, M stands for Mg, Al, Mn, Fe, Cu, Zr, Ti, Mo, W, B, or mixtures thereof, x satisfies $3.7 \leq x \leq 5.3$, y satisfies $0.1 \leq y \leq 0.5$, z satisfies $0.1 \leq z \leq 1.0$, and $5.1 \leq x+y+z \leq 5.5$, a hydrogen storage alloy (b) of a composition represented by the formula (1), wherein said alloy has a substantially single phase structure, and crystals of said alloy have an average long axis diameter of not smaller than 5 μm and smaller than 30 μm, and an electrically conductive material.

2. The anode for a nickel-hydrogen rechargeable battery of claim 1 wherein said R in the formula (1) for said alloys (a) and (b) is selected from the group consisting of La, Ce, Pr, Nd, and mixtures thereof.

3. The anode for a nickel-hydrogen rechargeable battery of claim 2, wherein a composition of said R in the formula (1) for said alloys (a) and (b) is 50 to 100 at % La, 0 to 50 at % Ce, 0 to 50 at % Pr, and 0 to 50 at % Nd.

4. The anode for a nickel-hydrogen rechargeable battery of claim 1, wherein said average long axis diameter of crystals of said alloy (a) is 70 to 120 μm.

5. The anode for a nickel-hydrogen rechargeable battery of claim 1, wherein said average long axis diameter of crystals of said alloy (b) is 10 to 20 μm.

* * * * *